(12) United States Patent
Yue et al.

(10) Patent No.: US 9,440,861 B2
(45) Date of Patent: Sep. 13, 2016

(54) METHOD FOR MODIFICATION OF LITHIUM ION BATTERY POSITIVE ELECTRODE MATERIAL

(71) Applicant: SHENZHEN BTR NEW ENERGY MATERIALS INC., Shenzhen, Guangdong (CN)

(72) Inventors: Min Yue, Guangdong (CN); Shunyi Yang, Guangdong (CN); Youyuan Huang, Guangdong (CN); Jianguo Ren, Guangdong (CN); Lin Cheng, Guangdong (CN)

(73) Assignee: Shenzhen BTR New Energy Materials Inc., Guangming New District, Shenzhen, Guangdong (CN)

( * ) Notice: Subject to any disclaimer, the term of this patent is extended or adjusted under 35 U.S.C. 154(b) by 184 days.

(21) Appl. No.: 14/281,479

(22) Filed: May 19, 2014

(65) Prior Publication Data

US 2014/0339464 A1 Nov. 20, 2014

(30) Foreign Application Priority Data

May 20, 2013 (CN) .......................... 2013 1 0188098

(51) Int. Cl.
| | | |
|---|---|---|
| *H01M 4/505* | (2010.01) | |
| *H01M 4/525* | (2010.01) | |
| *C01G 53/00* | (2006.01) | |

(52) U.S. Cl.
CPC .............. *C01G 53/50* (2013.01); *C01G 53/42* (2013.01); *H01M 4/525* (2013.01); *C01P 2004/03* (2013.01); *C01P 2006/40* (2013.01); *H01M 4/505* (2013.01); *Y02E 60/122* (2013.01)

(58) Field of Classification Search
None
See application file for complete search history.

(56) References Cited

FOREIGN PATENT DOCUMENTS

| | | | |
|---|---|---|---|
| CN | 101572308 A | | 11/2009 |
| CN | 102110807 | * | 6/2011 |
| CN | 102683672 A | | 9/2012 |
| CN | 103400978 A | * | 11/2013 |
| JP | 2005209649 A | | 8/2005 |
| JP | 2005285572 A | | 10/2005 |

* cited by examiner

Primary Examiner — Tanisha Diggs
(74) Attorney, Agent, or Firm — Polster, Lieder, Woodruff & Lucchesi

(57) ABSTRACT

The present invention discloses a method for modification of a lithium ion battery positive electrode material. The method comprises the following steps: (1) mixing organic acid and alcohol to obtain an organic solution; (2) adding positive electrode material into the organic solution to obtain a suspension; (3) washing with alcohol solvent after centrifugal separation; (4) drying treatment; the positive electrode material is a nickel-based metal oxide positive electrode material $LiNi_xM_{1-x}O_2$, wherein $0.5 \leq x < 1$ and M is one or two selected from the group consisting of Co, Mn, Al, Cr, Mg, Cu, Ti, Mg, Zn, Zr and V. Compared with the prior art, the method of the present invention utilizes the mixed solution of alcohol and organic acid to wash the positive electrode material thereby soluble Li salt impurities on the surface of the positive electrode material are removed and pH value of the material are significantly decreased; meanwhile, low-temperature drying treatment makes the washed material to be coated with alcohol molecules which can block air molecules, thereby the binding of water molecules and the positive electrode material are avoided and pole piece gumming are prevented, obviously improving high-temperature storage performance and cycling stability of battery. Further, the mixed solution of the alcohol and the organic acid after washing can be recycled, therefore cost is low and pollution on environment is avoided.

20 Claims, 1 Drawing Sheet

METHOD FOR MODIFICATION OF LITHIUM ION BATTERY POSITIVE ELECTRODE MATERIAL

CROSS-REFERENCE TO RELATED APPLICATIONS

This application claims priority under 35 U.S.C. §119 and 37 C.F.R. §1.55 to Chinese patent application Serial No. 201310188098.3, filed May 20, 2013, which is incorporated herein by reference.

TECHNICAL FIELD

The present invention relates to the field of lithium ion battery positive electrode material treatment, particularly to a method for modification of lithium ion battery positive electrode material method.

BACKGROUND OF THE INVENTION

Currently, the commonly used positive electrode material for high energy density lithium ion battery is $LiCoO_2$. Its energy density has reached its limit under the limitation of compacted density, maximum voltage, etc. Further, the battery polarization is great under this energy density thus it is difficult to meet the requirements of high output power and long working life. Compared with $LiCoO_2$, the layered lithium-nickel composite oxide positive electrode material $LiNi_xM_{1-x}O_2$, wherein M is one or two selected from the group consisting of Co, Mn, Al, Cr, Mg, Cu, Ti, Zn, Zr and V and wherein $0.5 \leq x < 1$, draws more and more attention in the field of lithium battery due to its advantages of high discharge capacity (170-230 mAh/g) and low cost.

In $LiNi_xM_{1-x}O_2$, Li atom is located at the position 3a, the transition metal atom is located at position 3b, and O atom is located at the position 6c of the $M'O_6$ octahedron (M'=Ni, Co, Mn, Al or Cr). Since the radius of $Li^+$ (0.76 Å) is very close to that of $Ni^{2+}$ (0.69 Å), during the high temperature sintering process, trace amount of Li volatilize, and part of Ni occupies the 3a position of Li in the crystal structure, forming a tiny structural subsidence area and lead to the lithium/nickel mixed arrangement. Lithium/nickel mixed arrangement results in escape of internal structure active oxygen and increase of the number of free lithium ion. The escaped active oxygen further contact and react with $CO_2$ and $H_2O$ in the air to form $CO_3^{2-}$ and $OH^-$. The resulted $CO_3^{2-}$ and $OH^-$ continue to react with the active lithium ion to generate lithium soluble salts such as $Li_2CO_3$ and LiOH, which adheres to the active substance surface, thereby increase pH of the material. High pH will have serious impact on performance of the material:
 (1) the material is highly hygroscopic to deteriorate, thus having poor compatibility with PVDF binder, poor dispersion and stability of slurry, easy gumming and low product yield.
 (2) the material will react with aluminum foil to generate flocculent precipitate Al $(OH)_3$, which will hinder the transfer of lithium ions to some extent, thereby affecting the battery capacity retention ratio and the rate capability.
 (3) pH increases and the moisture content at the material surface increase correspondingly, therefore in the battery high temperature storage, $LiPF_6$ reacts with the water introduced by nickel-based material to generate HF and HF further reacts with impurity $Li_2CO_3$ and LiOH to generate $CO_2$ gas and $H_2O$. $H_2O$, as an initiator further catalyze decomposition of LiPF6 thereby seriously reducing the battery performance and ultimately severely affecting the high-temperature storage performance and circulation stability of the lithium ion batteries using nickel-based material as a positive electrode material. Particularly, with respect to the lithium ion battery using aluminum-plastic composite film as packaging, the shell is fairly soft and gas production will lead to battery rapid expansion and deformation, thus producing serious security risks and limiting its use.

Chinese invention patent CN101572308A discloses a method for improving the overall performance of a lithium ion electrode material. The method uses a volatile organic solvent to stir and dry the electrode material, thus effectively preventing combination of the electrode material and water molecules to avoid gumming problems and improve processing performance of the electrode material. However, this method cannot remove the impurities $Li_2CO_3$ and LiOH at the surface of the electrode, nor decrease pH of the material, thus the high temperature storage performance and circulation stability of the battery are not essentially improved.

Chinese invention patent CN102683672A disclosed a method for lowering pH of ternary materials, wherein the ternary materials are rinsed and filtrated with deionized water or a solution containing $HCO_3^-$ and placed in a muffle furnace for two-stage sintering, thereby effectively reducing the pH value of the ternary materials and contributing to improve the electrochemical properties of the ternary materials. However, the method is comparatively complicated as twice high temperature sintering processes are required. It will not only prolong the production cycle and increase energy consumption, but also will produce more industrial waste water. Studies have shown that after the layered nickel-based positive electrode material $LiNi_{0.8}Co_{0.1}Mn_{0.1}O_2$ is washed with water, the structural stability and circulation stability in the electrolyte of the material has been significantly improved, while the first discharge specific capacity of the material is significantly lowered and largely affected by the temperature of the second sintering. In addition, when the material washed with water is exposed to air, it become easier to absorb moisture, thereby developing higher requirement for the material packaging, transport, storage and usage environment.

SUMMARY OF THE INVENTION

In view of the above, the present invention provides a method for modification of lithium ion battery positive electrode material, by which the soluble lithium impurities at the surface of positive electrode material surface is removed, the PH value of the positive electrode material is reduced, and the recombination of the material and the water molecular is effectively prevented and gumming problem of the pole piece is thoroughly solved, thereby improving high temperature storage performance and circulation stability of the battery.

The present invention provides a method for modification of lithium ion battery positive electrode material, comprising the following steps:
 (1) mixing organic acid with alcohol to obtain an organic solution;
 (2) adding the lithium ion battery positive electrode material into the organic solution and obtaining a suspension by mixing;
 (3) washing the material with alcohol solvent after centrifugal separation of the suspension;

(4) drying the washed lithium ion battery positive electrode material to obtain the modified lithium ion battery positive electrode material;

the lithium ion battery positive electrode material is nickel-based metal oxide positive electrode materials LiNi$_x$M$_{1-x}$O$_2$, wherein 0.5≤x<1 and M is one or two selected from the group consisting of Co, Mn, Al, Cr, Mg, Cu, Ti, Zn, Zr and V.

In an embodiment, the method of the invention comprises a recovery step after step (3), wherein the washed liquid is subjected to distillation and separation of solvent to obtain recyclable organic acid and alcohol.

In another embodiment, the distillation and separation is carried out in super gravity bed equipment.

In another embodiment, said M is one or two selected from the group consisting of Co, Mn, Al, Cr, Mg and Cu.

Preferably, the mixing in the step (1) applies stirring mixing with a stirring mixer.

Preferably, the lithium ion battery positive electrode material in the step (2) is powdered positive electrode material.

Preferably, the mixing in the step (2) applies stirring mixing with a stirring mixer.

In another embodiment, rotation speed of the stirring mixing in the step (1) is 50-500 rpm and mixing time is 5-80 min. Preferably, the rotation speed is 80-450 rpm and the mixing time is 8-70 min. Particularly preferably, the rotation speed is 100-400 rpm and the mixing time 10-60 min.

Preferably, mass ratio of the organic acid and alcohol in the step (1) is 1-38:19, preferably 1-25:19, particularly preferably 1-19:19.

Preferably, the organic acid in the step (1) is the carboxylic acid, preferably a C$_{1-8}$ carboxylic acid, particularly preferably at least one selected from the group consisting of formic acid, acetic acid, propionic acid, 2-propionic acid, valeric acid, n-caproic acid, butyric acid, trichloroacetic acid, trifluoroacetic acid and 2-methyl-propionic acid.

Preferably, the alcohol in the step (1) is C$_{1-6}$ alcohol, more preferably C$_{1-6}$ aliphatic alcohol, particularly preferably at least one selected from the group consisting of methanol, ethanol, isopropanol, glycerol, butanol, pentanol, n-hexanol, 2-Methoxyethanol, 2-ethoxyethanol.

In another embodiment, rotation speed of the stirring mixing in the step (2) is 50-500 rpm and mixing time is 5-300 min. Preferably, the rotation speed is 80-450 rpm and the mixing time is 20-270 min. Particularly preferably the rotation speed is 100-400 rpm and the mixing time 30-240 min.

Preferably, mass ratio of the lithium ion battery positive electrode material and the organic solution in the step (2) is 1-12:4, preferably 1I-10:4, particularly preferably 1-8:4.

In another embodiment, rotation speed of the centrifugal in the step (3) is 2000-10000 rpm and the centrifugal time is 5-40 min. Particularly preferably, the rotation speed is 3000-8000 rpm and the centrifugal time is 5-25 min.

Preferably, times of the washing in the steps (3) are 2 to 8 times, preferably 3 to 5 times.

Preferably, the alcohol solvent in the step (3) is C$_{1-6}$ alcohol, more preferably, C$_{1-6}$ aliphatic alcohol, particularly preferably, at least one selected from the group consisting of methanol, ethanol, isopropanol, glycerol, butanol, pentanol, n-hexanol, 2-Methoxyethanol and 2-ethoxyethanol.

In another embodiment, the drying in the step (4) applies the drying with vacuum oven and drying temperature is 30-120° C., more preferably 35-100° C., particularly preferably 40-90° C.

In another embodiment, the step (4) further comprises: screening the positive electrode material after drying.

In another embodiment, the method for modification of lithium ion battery positive electrode material of the invention comprises the following steps:

(1) stirring the organic acid and alcohol with mass ratio of 1-19:19 at 100-400 rpm for 10-60 min to obtain an organic solution;

(2) adding lithium ion battery positive electrode material into the organic solution, wherein mass ratio of the lithium ion battery positive electrode material and the organic solution is 1-8:4, and stirring the solution at 100-400 rpm for 30-240 min to obtain a suspension;

(3) placing the suspension in a centrifuge, centrifuging at 3000-8000 rpm for 5-25 min, then washing the positive electrode material post centrifugal with alcohol solvent for 3 to 5 times, and transferring the washed liquid to super gravity bed equipment to be subjected to distillation and separation of solvent to obtain recyclable organic acids and alcohols;

(4) drying the washed lithium ion batteries positive electrode material under 40-90° C., obtaining the modified lithium ion battery positive electrode material after screening.

Compared with the prior art, the method of the present invention uses the mixed solution of organic acid and alcohol to wash the positive electrode material, wherein the organic acid can react with impurities Li$_2$CO$_3$ and LiOH at the positive electrode material surface to generate organic lithium compounds which is soluble in alcohol solution. The organic lithium compounds are removed after centrifugation and washing, thereby PH value of the material is significantly reduced. In addition, the washed material is dried at a low temperature, residual alcohol molecules will envelope the material surface, thereby effectively achieving air isolation, effectively preventing combination of water molecules and the material, thereby solving the gumming problem of the pole piece and significantly improving the high temperature storage performance and circulation stability of the battery. Meanwhile, the process is simple and does not require secondary sintering process at a high temperature, thereby achieving low energy consumption. Furthermore, the mixed solution of organic acids and alcohols after washing is recyclable, thereby avoiding environmental pollution.

Figure 1:
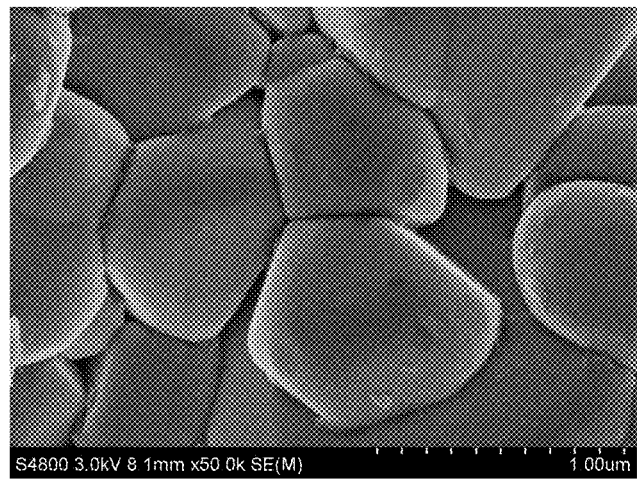
FIG. 1 is a SEM drawing of the untreated LiNi$_{0.8}$Co$_{0.1}$Mn$_{0.1}$O$_2$ positive electrode material of Example 2 of the present invention.

Table 1 shows physical and chemical indexes of the positive electrode material and the measurement results of the lithium ion battery performance in Examples 1-9 and Comparative Examples 1-10.

DETAILED DESCRIPTION

The following describe further details of present invention with drawings and examples. It is understandable that the specific embodiments described herein are merely for explaining the present invention but not limitation for the present invention. Also it should be noted that, for convenience of description, the drawings illustrate only some but not all of the structure associated with the present invention.

Example 1

950 g ethanol and 50 g formic acid were mixed in the vessel at 300 rpm for 10 min to obtain the mixed organic solution. 1000 g $LiNi_{0.8}Co_{0.2}O_2$ positive electrode material was slowly added to the mixed organic solution above with insistent stirring at 100 rpm for 120 min to obtain a suspension. The suspension was placed in a centrifuge for centrifugal separation at 6000 rpm for 10 min. Then the material post centrifugation is washed with ethanol for 3 times; the washed material was transferred to a vacuum furnace to be subjected to drying at 80° C., obtaining a modified positive electrode material. At the same time of centrifugation, the waste liquid was transferred to super gravity bed equipment to be subjected to distillation and separation of solvent. The organic acid and alcohol solvent after purification and separation were stored in specific containers for reuse.

Example 2

500 g methanol and 500 g acetic acid were mixed in the vessel at 400 rpm for 30 min to obtain the mixed organic solution. 2000 g $LiNi_{0.8}Co_{0.1}Mn_{0.1}O_2$ positive electrode material was slowly added to the mixed organic solution above with insistent stirring at 300 rpm for 240 min to obtain a suspension. The suspension was placed in a centrifuge for centrifugal separation at 5000 rpm for 15 min. Then the material post centrifugation was washed with methanol for 5 times; the washed material was transferred to a vacuum furnace to be subjected to drying at 40° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

Example 3

800 g ethanol and 200 g isopropionic acid were mixed in the vessel at 100 rpm for 10 min to obtain the mixed organic solution. 250 g $LiNi_{0.8}Co_{0.15}Al_{0.05}O_2$ positive electrode material was slowly added to the mixed organic solution above with insistent stirring at 400 rpm for 30 min to obtain a suspension. The suspension was placed in a centrifuge for centrifugal separation at 8000 rpm for 5 min. Then the material post centrifugal was washed with ethanol for 8 times; the washed material was transferred to a vacuum furnace to be subjected to drying at 90° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

Example 4

700 g glycerol and 300 g formic acid were mixed in the vessel at 200 rpm for 60 min to obtain the mixed organic solution. 500 g $LiNi_{0.6}Co_{0.2}Cr_{0.2}O_2$ positive electrode material was slowly added to the mixed organic solution above with insistent stirring at 300 rpm for 60 min to obtain a suspension. The suspension was placed in a centrifuge for centrifugal separation at 3000 rpm for 25 min. Then the material post centrifugation was washed with glycerol for 5 times; the washed material was transferred to a vacuum furnace to be subjected to drying at 60° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

Example 5

600 g ethanol and 400 g butyric acid were mixed in the vessel at 200 rpm for 20 min to obtain the mixed organic solution. 750 g $LiNi_{0.5}Co_{0.2}Mn_{0.3}O_2$ positive electrode material was slowly added to the mixed organic solution above with insistent stirring at 300 rpm for 180 min to obtain a suspension. The suspension was placed in a centrifuge for centrifugal separation at 4000 rpm for 20 min. Then the material post centrifugation was washed with ethanol for 4 times; the washed material was transferred to a vacuum furnace to be subjected to drying at 50° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

Example 6

200 g ethanol and 400 g acetic acid were mixed in the vessel at 500 rpm for 5 min to obtain the mixed organic solution. 1800 g $LiNi_{0.5}Co_{0.2}Mn_{0.3}O_2$ positive electrode material was slowly added to the mixed organic solution above with insistent stirring at 500 rpm for 5 min to obtain a suspension. The suspension was placed in a centrifuge for centrifugal separation at 1000 rpm for 60 min. Then the material post centrifugation was washed with ethanol for 5 times; the washed material was transferred to a vacuum furnace to be subjected to drying at 35° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

Example 7

380 g isopropanol and 500 g formic acid were mixed in the vessel at 50 rpm for 80 min to obtain the mixed organic solution. 2200 g $LiNi_{0.8}Co_{0.1}Mn_{0.1}O_2$ positive electrode material was slowly added to the mixed organic solution above with insistent stirring at 50 rpm for 300 min to obtain a suspension. The suspension was placed in a centrifuge for centrifugal separation at 2000 rpm for 40 min. Then the material post centrifugation was washed with isopropanol for 2 times; the washed material was transferred to a vacuum furnace to be subjected to drying at 30° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

Example 8

400 g isopropanol and 300 g acetic acid were mixed in the vessel at 80 rpm for 70 min to obtain the mixed organic solution. 300 g $LiNi_{0.8}Co_{0.15}Al_{0.05}O_2$ positive electrode material was slowly added to the mixed organic solution above with insistent stirring at 450 rpm for 20 min to obtain a suspension. The suspension was placed in a centrifuge for centrifugal separation at 2500 rpm for 30 min. Then the material post centrifugation was washed with isopropanol for 4 times; the washed material was transferred to a vacuum furnace to be subjected to drying at 120° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

Example 9

500 g n-butanol and 400 g acetic acid were mixed in the vessel at 450 rpm for 8 min to obtain the mixed organic solution. 1200 g $LiNi_{0.6}Co_{0.2}Cr_{0.2}O_2$ positive electrode material was slowly added to the mixed organic solution above with insistent stirring at 80 rpm for 270 min to obtain a suspension. The suspension was placed in a centrifuge for centrifugal separation at 10000 rpm for 2 min. Then the material post centrifugal was washed with n-butanol for 3 times; the washed material was transferred to a vacuum furnace to be subjected to drying at 100° C., obtaining a modified positive electrode material after screening. At the same time of centrifugation, the waste liquid was transferred to super gravity bed equipment to be subjected to distillation and separation of solvent. The organic acid and alcohol solvent after purification and separation were stored in specific containers for reuse.

According to the method disclosed in Chinese patent publication CN101572308A, positive electrode materials $LiNi_{0.8}Co_{0.2}O_2$, $LiNi_{0.8}Co_{0.1}Mn_{0.1}O_2$, $LiNi_{0.8}Co_{0.15}Al_{0.05}O_2$, $LiNi_{0.6}Co_{0.2}Cr_{0.2}O_2$ and $LiNi_{0.5}Co_{0.2}Mn_{0.3}O_2$ were treated to form Comparative Examples 1-5 as follows:

Comparative Example 1

1000 g ethanol was stirred in a vessel at 50 rpm for 10 min to obtain the mixed organic solution. 1000 g $LiNi_{0.8}Co_{0.2}O_2$ positive electrode material was slowly added to the mixed organic solution above and the solution was placed in an oven under a constant temperature of 70° C. At the same time, a mixer was turned on to insistently stir at 100 rpm to evaporate the organic solvent. After all the organic solvent was evaporated, the obtained positive electrode material was transferred to a vacuum furnace to be subjected to drying at 60° C., obtaining a modified positive electrode material after screening.

Comparative Example 2

1000 g ethanol was stirred in a vessel at 50 rpm for 10 min to obtain the mixed organic solution. 1000 g $LiNi_{0.8}Co_{0.2}Mn_{0.1}O_2$ positive electrode material was slowly added to the mixed organic solution above and the solution was placed in an oven under a constant temperature of 70° C. At the same time, a mixer was turned on to insistently stir at 100 rpm to evaporate the organic solvent. After all the organic solvent was evaporated, the obtained positive electrode material was transferred to a vacuum furnace to be subjected to drying at 60° C., obtaining a modified positive electrode material after screening.

Comparative Example 3

1000 g ethanol was stirred in a vessel at 50 rpm for 10 min to obtain the mixed organic solution. 1000 g $LiNi_{0.8}Co_{0.15}Al_{0.05}O_2$ positive electrode material was slowly added to the mixed organic solution above and the solution was placed in an oven under a constant temperature of 70° C. At the same time, a mixer was turned on to insistently stir at 100 rpm to evaporate the organic solvent. After all the organic solvent was evaporated, the obtained positive electrode material was transferred to a vacuum furnace to be subjected to drying at 60° C., obtaining a modified positive electrode material after screening.

Comparative Example 4

1000 g ethanol was stirred in a vessel at 50 rpm for 10 min to obtain the mixed organic solution. 1000 g $LiNi_{0.6}Co_{0.2}Cr_{0.2}O_2$ positive electrode material was slowly added to the mixed organic solution above and the solution was placed in an oven under a constant temperature of 70° C. At the same time, a mixer was turned on to insistently stir at 100 rpm to evaporate the organic solvent. After all the organic solvent was evaporated, the obtained positive electrode material was transferred to a vacuum furnace to be subjected to drying at 60° C., obtaining a modified positive electrode material after screening.

Comparative Example 5

1000 g ethanol was stirred in a vessel at 50 rpm for 10 min to obtain the mixed organic solution. 1000 g $LiNi_{0.5}Co_{0.2}Mn_{0.3}O_2$ positive electrode material was slowly added to the mixed organic solution above and the solution was placed in an oven under a constant temperature of 70° C. At the same time, a mixer was turned on to insistently stir at 100 rpm to evaporate the organic solvent. After all the organic solvent was evaporated, the obtained positive electrode material was transferred to a vacuum furnace to be subjected to drying at 60° C., obtaining a modified positive electrode material after screening.

Comparative Example 6

Untreated $LiNi_{0.8}Co_{0.2}O_2$ positive electrode material.

Comparative Example 7

Untreated $LiNi_{0.8}Co_{0.1}Mn_{0.1}O_2$ positive electrode material.

Comparative Example 8

Untreated $LiNi_{0.8}Co_{0.15}Al_{0.05}O_2$ positive electrode material.

Comparative Example 9

Untreated $LiNi_{0.6}Co_{0.2}Cr_{0.2}O_2$ positive electrode material.

Comparative Example 10

Untreated $LiNi_{0.5}Co_{0.2}Mn_{0.3}O_2$ positive electrode material.

S-4800 field emission scanning electron microscopy from Hitachi Ltd., Japan was used to make topography observation for the positive electrode materials of Example 2 and Comparative Example 2.

The following methods were used to test the positive electrode materials of Examples 1-9 and Comparative Examples 1-10:

Test of $Li_2CO_3$ and LiOH impurity content at surface: hydrochloric acid standard solution was used to titrate $Li_2CO_3$ and LiOH impurity content of the positive electrode material, value of $Li_2CO_3$ and LiOH was calculated by consuming volume of hydrochloric acid.

Test of pH value: 5 g positive electrode material was weighed out and placed in 45 ml of double-distilled water without carbon dioxide. The solution was thoroughly stirred or subjected to sonication. Supernatant was collected to test pH value with Mettler PH meter.

The positive electrode materials of Examples 1-5 and Comparative Examples 1-5 were assembled into 7090130P by the following method:

Preparation of positive electrode plate: in a 5 L mixer, the positive electrode active material, binder PVDF and conductive agent super-P were proportioned for positive electrode in a ratio of 97:1:2 in oil system and under vacuum condition to obtain uniform positive electrode slurry. The prepared positive electrode slurry was evenly coated on positive electrode current collector Al foil to obtain the positive electrode plate.

Preparation of the negative plate: graphite, thickeners CMC, binder SBR and conductive carbon powder were proportioned for negative electrode in a ratio of 95:1:2:2 in water system to obtain uniform negative electrode slurry. The prepared negative electrode slurry was evenly coated on negative current collector Cu foil and cooled to obtain the negative plate.

Preparation of Lithium ion battery: the positive electrode plate and negative electrode plate prepared according to the above process were rolled with diaphragm to prepare lithium ion battery core and non-aqueous electrolyte was injected to prepare 7090130P soft pack battery, wherein non-aqueous electrolyte solution uses 1.0 mol/L of $LiPF_6$ as non-aqueous electrolyte and use mixture of ethylene carbonate and diethyl carbonate in a volume ratio of 1:1 as non-aqueous solvent.

Test of slurry gumming performance of the positive electrode materials of the Examples and Comparative Examples: the prepared positive electrode slurry was placed in a sealed container under 25° C. and 80% humidity. In the container was placed a beaker filled with water to provide a hydrous circumstance. The material gumming performance was tested and test record was made every hour to record the slurry gumming situation.

The prepared lithium ion batteries for Examples and Comparative Examples were tested for electrical properties with the following method:

Charge-discharge test: the lithium ion battery was subjected to formation: it was charged to 3.4V at a constant current of 0.01 C under 45° C., then charged to 3.8V at a constant current of 0.2 C, then charged to 4.2V at a constant current of 0.2 C at room temperature, then maintain the constant voltage till the current decreases to 0.05 C. After 5 min standing, it was discharged to 3V at 0.2 C. The discharge capacity and discharge capacity after 400 cycles were recorded.

Test of high temperature storage performance at 60° C. for 30 days: at room temperature, the battery was tested for the initial discharge capacity at 1.0 C current, then charged to 4.2V at a constant current of 1.0 C, then charged at constant voltage till the current decreases to 0.05 C, then charging was stopped. After 1 h standing, the thickness was measured, then the battery was placed in a 60° C.±2° C. high temperature box and stored for 30 days. Then the thickness of the battery was measured in the high temperature box. The battery was taken out to the room temperature for 1 hour standing, and then the battery was tested for remaining capacity at room temperature at 1.0 C current. The capacity retention rate was calculated by dividing the remaining capacity by the initial discharge capacity.

TABLE 1

| name | $Li_2CO_3$ content (wt %) | LiOH content (wt %) | pH | Gumming situation | 400 cycles capacity retention rate (%) | 60° C., 30 days Thickness expansion rate (%) | 60° C., 30 days Capacity retention rate (%) |
|---|---|---|---|---|---|---|---|
| Example 1 | 0.352 | 0.122 | 11.47 | No gumming after 48 h | 85.3 | 12.2 | 92.5 |
| Comparative Example 1 | 0.970 | 0.689 | 12.93 | Gumming after 10 h | 77.8 | 28.9 | 86.8 |
| Comparative Example 6 | 0.972 | 0.693 | 12.95 | Gumming after 1 h | 75.7 | 32.7 | 85.7 |
| Example 2 | 0.169 | 0.095 | 11.22 | No gumming after 60 h | 87.9 | 10.7 | 96.7 |
| Comparative Example 2 | 0.627 | 0.481 | 12.38 | Gumming after 21 h | 81.7 | 20.8 | 91.5 |
| Comparative Example 7 | 0.631 | 0.484 | 12.41 | Gumming after 3 h | 79.2 | 24.4 | 89.3 |
| Example 3 | 0.243 | 0.111 | 11.32 | No gumming after 60 h | 85.8 | 12.2 | 93.5 |
| Comparative Example 3 | 0.721 | 0.526 | 12.53 | Gumming after 21 h | 74.5 | 33.9 | 89.3 |
| Comparative Example 8 | 0.723 | 0.537 | 12.66 | Gumming after 3 h | 72.7 | 35.6 | 88.8 |
| Example 4 | 0.108 | 0.016 | 10.95 | No gumming after 72 h | 90.2 | 8.9 | 95.9 |
| Comparative | 0.412 | 0.127 | 11.65 | Gumming | 86.9 | 13.5 | 94.8 |

TABLE 1-continued

| name | Li$_2$CO$_3$ content (wt %) | LiOH content (wt %) | pH | Gumming situation | 400 cycles capacity retention rate (%) | 60° C., 30 days Thickness expansion rate (%) | 60° C., 30 days Capacity retention rate (%) |
|---|---|---|---|---|---|---|---|
| Example 4 | | | | after 30 h | | | |
| Comparative Example 9 | 0.418 | 0.128 | 11.67 | Gumming after 10 h | 81.2 | 20.7 | 92.4 |
| Example 5 | 0.072 | 0.008 | 10.65 | No gumming after 72 h | 95.6 | 4.5 | 98.3 |
| Comparative Example 5 | 0.155 | 0.099 | 11.19 | Gumming after 37 h | 90.5 | 8.1 | 95.6 |
| Comparative Example 10 | 0.158 | 0.104 | 11.26 | Gumming after 24 h | 88.4 | 10.5 | 94.9 |
| Example 6 | 0.081 | 0.009 | 10.69 | No gumming after 72 h | 95.1 | 4.9 | 97.9 |
| Example 7 | 0.181 | 0.085 | 11.29 | No gumming after 60 h | 87.4 | 10.5 | 95.2 |
| Example 8 | 0.287 | 0.118 | 11.39 | No gumming after 60 h | 84.9 | 13.1 | 93.1 |
| Example 9 | 0.117 | 0.023 | 11.02 | No gumming after 72 h | 91.1 | 9.4 | 95.4 |

The physical chemical indexes of the positive electrode material and the performance result of the lithium ion battery of Examples 1-9 and Comparative Examples 1-10 of the present invention of the lithium ion batteries are shown in Table 1. As shown in Table 1, with respect to the material after modification using the method of the present invention, Li$_2$CO$_3$ and LiOH content on the active substance decreases significantly; pH of the material decreases significantly and slurry gumming phenomenon almost does not exist; 400 cycles capacity retention rate at room temperature is largely improved; storage thickness expansion rate at high temperature is significantly reduced; and the capacity retention rate is significantly improved.

Figure 2:
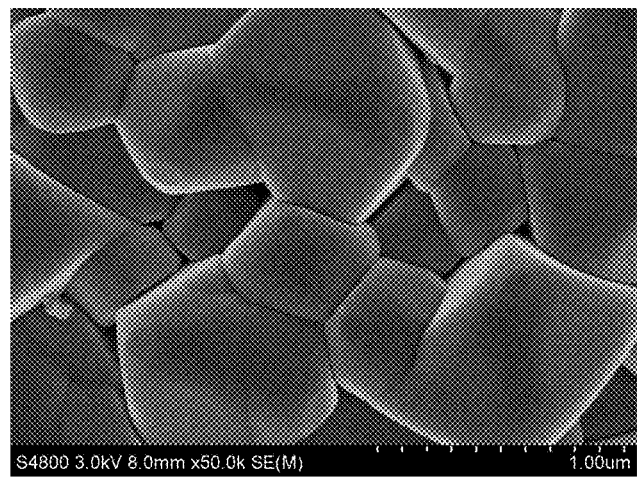
FIG. 2 is a SEM drawing of the modified LiNi$_{0.8}$Co$_{0.1}$Mn$_{0.1}$O$_2$ positive electrode material of Example 2 of the present invention.

Comparing FIGS. 1 and 2, it can be seen that surface of the material before the modification is comparatively rough and the surface becomes smooth after modification, which demonstrate that the material surface impurities have been removed after modification.

The above demonstrates that pH of the lithium ion battery positive electrode material treated according to the present invention significantly decreases, processing performance is significantly improved, and cycle stability and high temperature storage performance are improved.

The applicant stated that the present invention employ the Examples above to describe the detailed technological equipment and technological process, but the present invention is not limited to the above technological equipment and technological process, i.e. it does not mean that the present invention must rely on the above detailed technological equipment and technological process to implement. A person skilled in the art should understand, any improvement of the present invention, the equivalent replacement to the raw materials of the present invention product, adding auxiliary ingredients, specific mode selection, etc., all fall within the protection scope and disclosure scope of the present invention.

The invention claimed is:

1. A method for modification lithium ion battery positive electrode material, comprising the following steps:
   (1) mixing organic acid with alcohol to obtain an organic solution;
   (2) adding the lithium ion battery positive electrode material into the organic solution to obtain a suspension by mixing;
   (3) washing the material with alcohol solvent after centrifugal separation of the suspension;
   (4) drying the washed lithium ion battery positive electrode material to obtain the modified lithium ion battery positive electrode material;
   the lithium ion battery positive electrode material is nickel-based metal oxide positive electrode materials LiNi$_x$M$_{1-x}$O$_2$, wherein 0.5≤x<1 and M is one or two selected from the group consisting of Co, Mn, Al, Cr, Mg, Cu, Ti, Zn, Zr and V.

2. The method according to claim 1, further comprising a recycle step after the step (3), wherein the washed liquid is subjected to distillation and separation of solvent to obtain recyclable organic acid and alcohol.

3. The method according to claim 2, wherein the distillation and separation is conducted in super gravity bed equipment.

4. The method according to claim 1, wherein M is one or two selected from the group consisting of Co, Mn, Al, Cr, Mg and Cu.

5. The method according to claim 1, wherein the mixing in the step (1) applies stirring mixing with a stirring mixer.

6. The method according to claim 1, wherein the lithium ion battery positive electrode material in the step (2) is powder.

7. The method according to claim 1, wherein the mixing in step (2) applies stirring mixing with a stirring mixer.

8. The method according to claim 5, wherein rotation speed of the stirring mixing in the step (1) is 50-500 rpm and mixing time is 5-80 min.

9. The method according to claim 1, wherein mass ratio of the organic acid and alcohol in the step (1) is 1-38:19.

10. The method according to claim 1, wherein the organic acid in the step (1) is carboxylic acid.

11. The method according to claim 10, wherein the organic acid in the step (1) is at least one selected from the group consisting of formic acid, acetic acid, propionic acid, 2-propionic acid, valeric acid, n-caproic acid, butyric acid, trichloroacetic acid, trifluoroacetic acid and 2-methyl propionic acid.

12. The method according to claim 1, wherein the alcohol in the step (1) is $C_{1-6}$ alcohol.

13. The method according to claim 12, wherein the alcohol in the step (1) is at least one selected from the group consisting of methanol, ethanol, isopropanol, glycerol, butanol, pentanol, n-hexanol, 2-methoxyethanol, 2-ethoxyethanol.

14. The method according to claim 7, wherein rotation speed of the stirring mixing in the step (2) is 50-500 rpm and mixing time is 5-300 min.

15. The method according to claim 1, wherein mass ratio of the lithium ion battery positive electrode material and the organic solution in the step (2) is 1-12:4.

16. The method according to claim 1, wherein rotation speed of the centrifugal separation in the step (3) is 1000-10000 rpm and centrifugal time is 60 min.

17. The method according to claim 1, wherein the alcohol solvent in the step (3) is $C_{1-6}$ alcohol.

18. The method according to claim 1, wherein the drying in the step (4) applies drying with vacuum oven and drying temperature is 30-120° C.

19. The method according to claim 1, wherein the step (4) further comprises screening the positive electrode material after drying.

20. The method according to claim 1, comprising the following steps:
  (1) stirring the organic acid and alcohol with mass ratio of 1-19:19 at a rotation speed of 100-400 rpm for 10-60 min to obtain an organic solution;
  (2) adding the lithium ion battery positive electrode material into the organic solution, wherein mass ratio of the lithium ion battery positive electrode material and the organic solution is 1-8:4, and stirring at 100-400 rpm for 30-240 min to obtain a suspension;
  (3) placing the suspension in a centrifuge, centrifuging at 3000-8000 rpm for 5-25 min, then washing the positive electrode material post centrifugation with alcohol solvent for 3 to 5 times, and transferring the washed liquid to super gravity bed equipment to be subjected to distillation and separation of solvent to obtain recyclable organic acids and alcohols;
  (4) drying the washed lithium ion batteries positive electrode material under 40-90° C., obtaining the modified lithium ion battery positive electrode material after screening.

* * * * *